(12) United States Patent
Wolframm et al.

(10) Patent No.: US 7,002,508 B2
(45) Date of Patent: Feb. 21, 2006

(54) METHOD FOR INTERFEROMETRIC RADAR MEASUREMENT

(75) Inventors: Aribert P. Wolframm, Landsberg (DE); Helmut Klausing, Wessling-Hochstadt (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/770,830

(22) Filed: Feb. 3, 2004

(65) Prior Publication Data

US 2005/0128126 A1    Jun. 16, 2005

Related U.S. Application Data

(63) Continuation-in-part of application No. 09/889,759, filed as application No. PCT/DE99/04066 on Dec. 22, 1999, now abandoned.

(30) Foreign Application Priority Data

Jan. 21, 1999    (DE) ................................. 199 02 007

(51) Int. Cl.
    *G01S 13/90* (2006.01)
(52) U.S. Cl. ................. 342/25 R; 342/25 A; 342/25 C
(58) Field of Classification Search ............. 342/25 R, 342/25 A, 25 B, 25 C, 25 D, 25 E, 25 F
    See application file for complete search history.

(56) References Cited

U.S. PATENT DOCUMENTS

| | | | |
|---|---|---|---|
| 4,546,354 A | | 10/1985 | Boles |
| 4,638,315 A | * | 1/1987 | Raven ...................... 342/25 F |
| 5,017,922 A | * | 5/1991 | Klausing et al. .......... 342/25 F |
| 5,160,931 A | | 11/1992 | Brown |
| 5,392,047 A | * | 2/1995 | Klausing .................. 342/25 F |
| 5,451,957 A | * | 9/1995 | Klausing .................. 342/25 R |
| 5,614,907 A | | 3/1997 | Kreitmair-Steck et al. |
| 5,659,318 A | | 8/1997 | Madsen et al. |
| 5,777,573 A | * | 7/1998 | Klausing et al. .......... 342/25 F |
| 6,166,677 A | | 12/2000 | Kikuchi et al. |
| 6,577,264 B1 | * | 6/2003 | Wolframm ................ 342/25 R |
| 2005/0128126 A1 | * | 6/2005 | Wolframm et al. ....... 342/25 R |

FOREIGN PATENT DOCUMENTS

| | | |
|---|---|---|
| DE | 39 22 086 C1 | 10/1990 |
| DE | 43 06 920 A1 | 9/1994 |
| DE | 43 28 573 A1 | 3/1995 |
| EP | 0 634 668 A1 | 1/1995 |
| EP | 0 757 259 A1 | 2/1997 |
| WO | WO 43808 A1 * | 7/2000 |

OTHER PUBLICATIONS

"Migration technique for rotor synthetic aperture radar", Min Jeon; Young Soo Kim; Electronics Letters vol. 33, Issue 7, Mar. 27, 1997 pp.:630-631.*

(Continued)

*Primary Examiner*—John B. Sotomayor
(74) *Attorney, Agent, or Firm*—Collard & Roe, P.C.

(57) ABSTRACT

It is proposed in connection with a method for the interferometric radar measurement in conjunction with a helicopter operating in accordance with the ROSAR principle (Heli-Radar) that two coherent receiving antennas with receiving channels are associated with a transmitter of the ROSAR-system mounted on the revolving rotary cross; and that the difference ($\Delta R$) between the two distances ($R+\Delta R$, R) from the measured impact point P are calculated, in the manner known per se, based on the wavelength $\lambda$ of the emitted radar signal and the measured phase difference of the receiving echo of the two coherent receive channels.

6 Claims, 5 Drawing Sheets

OTHER PUBLICATIONS

"Feasibility of a synthetic aperture radar with rotating antennas (ROSAR)", Klausing, H.; Keydel, W.; Radar Conference, 1990., Record of the IEEE 1990 Int'l May 7-10, 1990 Ps:51-56.*

Blake, et al, (1990) *Radar Handbook*, Second Edition, McGraw-Hill, Inc. (enclosed).

Griffiths, H. (1995) Interferometric Synthetic Aperture Radar:, Electronics and Communication Engineering Journal, GB, Institution of Electrical Engineers, London, vol. 7, pp. 247-256 (encl).

Stefan Buckreuss et al. (1994) "Advanced SAR Interferometry Study", DLR (enclosed).

Christopher T. Allen (1995) "Interferometric Synthetic Aperture Radar", IEEE Geoscience and Remote Sensing Society Newsletter, pp. 6-13 (enclosed).

* cited by examiner

METHOD FOR INTERFEROMETRIC RADAR MEASUREMENT

CROSS REFERENCE TO RELATED APPLICATIONS

This application is a continuation in part application of U.S. patent application Ser. No. 09/889,759 filed on Jul. 20, 2001, now abandoned incorporated herein by reference wherein priority is claimed under 35 U.S.C. 120, this application also claims priority under 35 U.S.C. §371 from PCT/DE99/04066 filed on Dec. 22, 1999, and also claims priority under 35 U.S.C. 119 from German Patent Application DE 199020078 filed on Jan. 21, 1999.

BACKGROUND

The invention relates to a method for interferometric radar measurements.

Due to their construction, radar devices are precise range-finding systems, which means that without special measures, a radar device is capable of determining only the distance of a target from the antenna, but not its direction. It is possible to determine only whether a target is present within the lobe of the antenna.

This problem is eliminated to a large extent in conjunction with the ROSAR or Heli-Radar system known until now by using, for example 16 vertically staggered antennas with an antenna opening angle of, for example 2.5°. It is possible with this type of a system to determine the location of an elevated obstruction etc. within an accuracy of about 2.5° in terms of elevation. However, in this case, targets located at the same distance are also displayed in the same antenna in the same image spot.

The azimuthal resolution of the known Heli-Radar system amounts to about 0.2° because of a special signal processing. These features are taught in the disclosure in DE 39 22 086 C1. However, the direction of an obstruction and thus the location in space at which this obstruction is located can be determined only with the help of a triangulation, whereby in the simplest case, two locally separated radar installations can be used for this purpose.

However, it is also possible to use the properties of a coherent radar system and to perform a triangulation with the help of the phase of the emitted signal. Thus, a coherent radar system is used which coherently transmits a signal via a transmitting antenna and receives the echoes scattered back via two locally separated receiving antennas. A coherent evaluation permits a calculation of the phase difference between receiving signals. The direction from which the scattered echoes are received is determined based on the phase difference. Now, once the distance and direction of an "obstruction" have been computed, its location in space can be determined as well. This type of three-dimensional determination of a location with the help of a coherent radar system which comprises one transmitting antenna and two receiving antennas is generally referred to as "radar interferometry" and known for a long time. It is used already for the generation of topographic charts with the help of SAR-systems installed on aircraft, for example by the DOSAR system of the firm Dornier GmbH.

With these designs, reference is also made to the following published documents pertaining to the further state of the art:

C. T. Allan, Review Article, Interferometric Synthetic Aperture Radar, in IEEE Geoscience and Remote Sensing Society News Letter, September 1995, p. 6 ff; S. Buckreuss, J. Moreira, H. Rinkel and G. Waller, Advanced SAR Interferometry Study, DLR Bulletin 94, Jun. 10, 1994, Institut für Hochfrequenztechnik, Oberpfaffenhofen.

The entire prior art known to this date and the state of the art cited above, including the ROSAR principle on which the present invention is based, projects terrain elevations or other elevated obstructions in one plane, so that it is not possible to recognize the elevation of the given obstruction if the reproduced topography of the terrain present is unknown. However, a three-dimensional image is required for controlling flights.

The present invention is based on the problem of proposing measures on the basis of the ROSAR principle that permit a quasi-three-dimensional image representation of terrain and other obstructions.

SUMMARY

The problem is solved with an arrangement for interferometric radar measurement having a transmitter and two assigned coherent receiving antennas with receiving channels. The transmitter and receiving antennas are arranged on the turnstile of the ROSAR system of a helicopter radar. An additional transmitting/receiving antenna is provided wherein this additional transmitting/receiving antenna is sharply focused in the elevation direction. The transmitter and receiving antennas are arranged at the end of the turnstile. The receiving antennas are also arranged at the end of the turnstile.

The arrangement includes a process whereby two coherent receiving antennas with receiving channels are assigned to a first transmitter, and the path length difference of the two distances can be calculated to measured receiving point P from the wave length of the transmitted radar signal and of the measured phase difference of the reception echo of both coherent receiving channels. A helicopter operating according to the ROSAR principle is used for the interferometric radar measurement, whereby two coherent receiving antennas are assigned to a transmitter of the ROSAR system arranged on a rotating turnstile on the radar. Additionally, receiving signals of the sharply focused or second transmitting/receiving antenna can be evaluated for determination of the phase difference.

The sight angle is used for calculating the coordinates of the respective receiving point for representing the image points on the integrated graphic display screen in the ROSAR system. The antennas and the center of the image on the graphic display screen are in a fixed relationship to each other.

The first transmitter along with the two receiving antennas are used to determine the location of point P. However, this determination of the location of point P may contain inaccuracies or ambiguities because these two receiving antennas have a value of a measured phase difference that is ambiguous wherein this ambiguity can only be determined down to a value ranging between 0 and $2\pi$. Therefore, this ambiguity must be determined by additional measurements. Thus to provide these additional measurements there is the additional or sharply focused transmitting and receiving antenna. This transmitting and receiving antenna is located in the end of the antenna cross and wherein this antenna has a narrow beam. This antenna covers the lower range of the sight angle. The distance to the impact point on the ground can be clearly determined by the receive echo of this additional transmitting/receiving antenna. Thus, this INRO-SAR-system accepts the distance as a basic value and calculates the further ambiguities based on the rising distance from the continuous phase transitions.

Thus, this system is a system with a first antenna transmitter with two receiving antennas and then one additional transmitting and receiving antenna that is used to dispel any ambiguities of the signal received by the first antenna transmitter and receiver.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION

Figure 1:
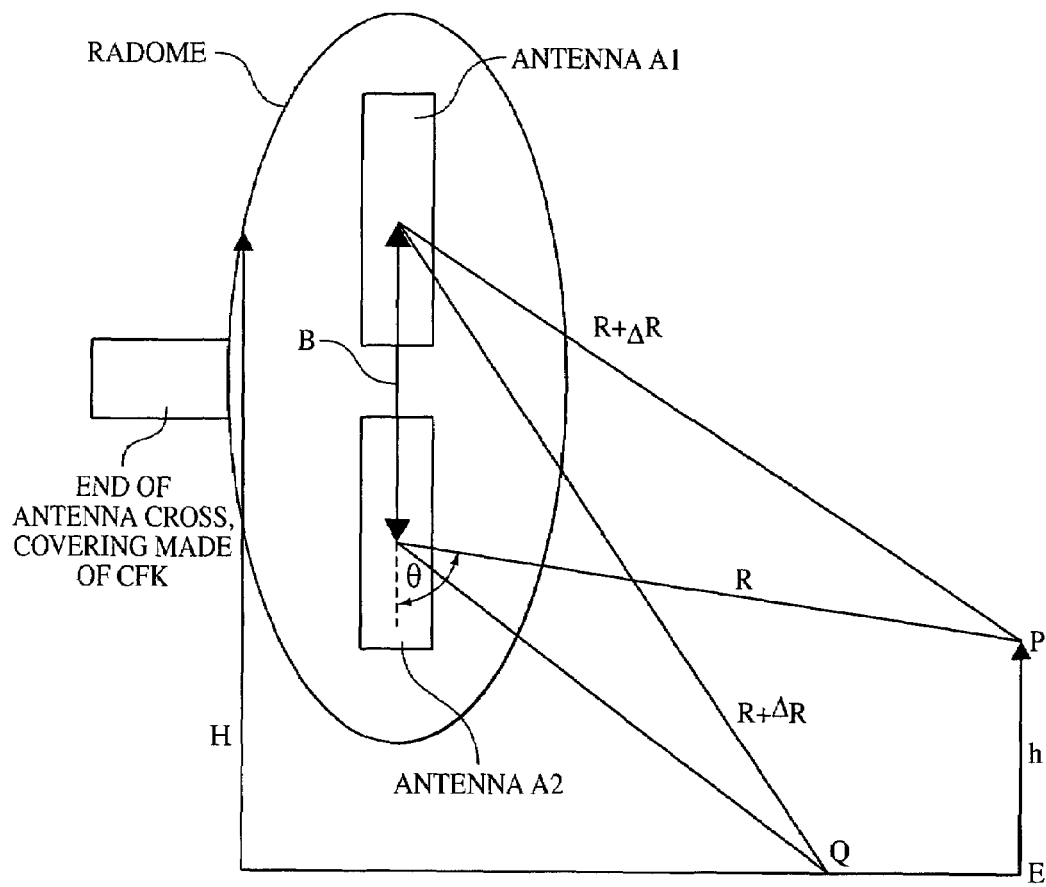
FIG. 1 shows a schematic representation of an exemplified embodiment with respect to the typical geometry for an interferometric ROSAR system.

According to the general idea of the invention, the goal is to obtain in conjunction with a helicopter operating according to the ROSAR-system a quasi-three-dimensional radar image representation for flight guidance by associating with a transmitter located on the rotating rotary cross two coherent receiving antennas with receiving channels.

The ROSAR-system used heretofore is comprised of, for example 16 transmitters and receivers with their channels for obtaining a three-dimensional image. However, these transmitters and receivers have a directional inaccuracy of about 2.5°. Now, if said ROSAR-system, as mentioned above, is expanded by a highly precise coherent receiving channel, only one transmitter and two coherent receivers instead of the, for example sixteen transmitters and receivers employed until now will be required for obtaining the highly precise three-dimensional radar image. The directional inaccuracy found until now is enhanced by the interferometric principle by about a factor of 100.

This is explained in the following description of an exemplified embodiment of the invention, which is sketched in FIG. 1.

A helicopter operating according to the ROSAR principle flies over the surface of the earth at an altitude H. One transmitting antenna and two receiving antennas with associated coherent transmitting and receiving electronics are mounted on the end of the rotating antenna cross. The received echoes are amplified, digitized and processed further.

The distance between this arrangement as described above, which is referred to in the following as the INROSAR-system, and the impact point P, which is located at a relative altitude h, is referred to as R. The distance from the antenna $A_1$ of the INROSAR-system to the impact point P amounts to $R+\Delta R$ and is therefore by a small amount $\Delta R$ greater than the distance R to the antenna $A2$. The difference $\Delta R$ between the two distances can be calculated based on the known wavelength $\lambda$ of the emitted radar signal and the measured phase difference $\phi$ of the receiving echo of the two coherent receiving channels. Impact point Q has a relative altitude lower than impact point P and is on the surface of the Earth E.

Now, this phase difference $\phi$ of the receiving echo is in turn calculated based on the images generated by processing the receiving echo. Each of the two images is present in a complex, digital form, i.e. it comprises a real part and an imaginary part, or equivalent: the amplitude and the phase.

Now, the phase difference $\phi$ follows up to a multiple of p (modulo p) through complex multiplication of the image points of the one image with the conjugated complex image points of the other image, and subsequent formation of the arctangent of the respective real and imaginary parts. The phase difference $\phi$ is obtained in this way, and by inserting $\phi$ in equation 1, $\Delta R$ is then obtained.

$$\Delta R = \frac{\lambda}{4\pi} \Delta \Phi \qquad (1)$$

The phase centers of the two receiving antennas $A_1$ and $A_2$ are removed by the length B, the so-called base line. The following results from the cosinus theorem and a few simple angle relations:

$$\cos(\theta) = \frac{(R+\Delta R)^2 - R^2 - B^2}{2 \cdot R \cdot B} \qquad (2)$$

After the sight angle $\theta$ has been calculated in equation (2), it is now possible to determine the relative altitude h as follows:

$$h = H - R \cdot \cos(\theta) \qquad (3)$$

The altitude h is actually not required in connection with the INROSAR system for representing the image points on the graphics display screen DS, but only the sight angle $\theta$ is used for calculating the coordinates of an impact point P on the integrated graphics display screen in the Rosar system. Furthermore, whether the angle of inclination of the antenna is known or not is unimportant as well because the representation on the display screen is only a relative representation of the image points with respect to the vertical line in relation to the base line B of the two antennas $A_1$ and $A_2$. The representation of the image is in fact dependent upon the position of the helicopter, for example due to the pitching. However, the antennas of the INROSAR-system and the center of the image are always in a fixed relation to each other. The altitude h and the angle of inclination $\alpha$ of the antennas are only required if a topographical chart with an absolute altitude H of the area over which the aircraft is passing is to be generated with the help of said INROSAR-system. The formulas specified above are useful also for a consideration of errors, as will be explained in the following.

The errors relevant to the INROSAR-system are the phase noise df and the change in the base line B between the phase centers of the antennas $A_1$ and $A_2$. The phase noise is composed of the sum of proportions of the different components. The greatest contributions are supplied by the transmitter, the receivers, the system timer and the noise of the A/D-converter. A typical order of magnitude for the entire phase noise $\delta\phi$ of an INROSAR-system amounts to approximately 5°. The change in the base line between the phase centers of the antennas $A_1$ and $A_2$ may be caused, for example by heating due to the incidence of sunlight rays. 0.001 m is assumed to be a typical value. The various influences result in a scatter δh of the altitude of the impact point P and thus in a scatter of the sight angle δθ.

$$\delta h = \frac{\lambda \cdot R}{4\pi \cdot B} \delta\phi \quad (4)$$

$$\delta h = -R \cdot \tan(\theta) \frac{\delta B}{B} \quad (5)$$

This results in scatter of the sight angle dθ as follows:

$$\delta\theta = \arcsin\left(\frac{\delta h}{R}\right) \quad (6)$$

Figure 4:
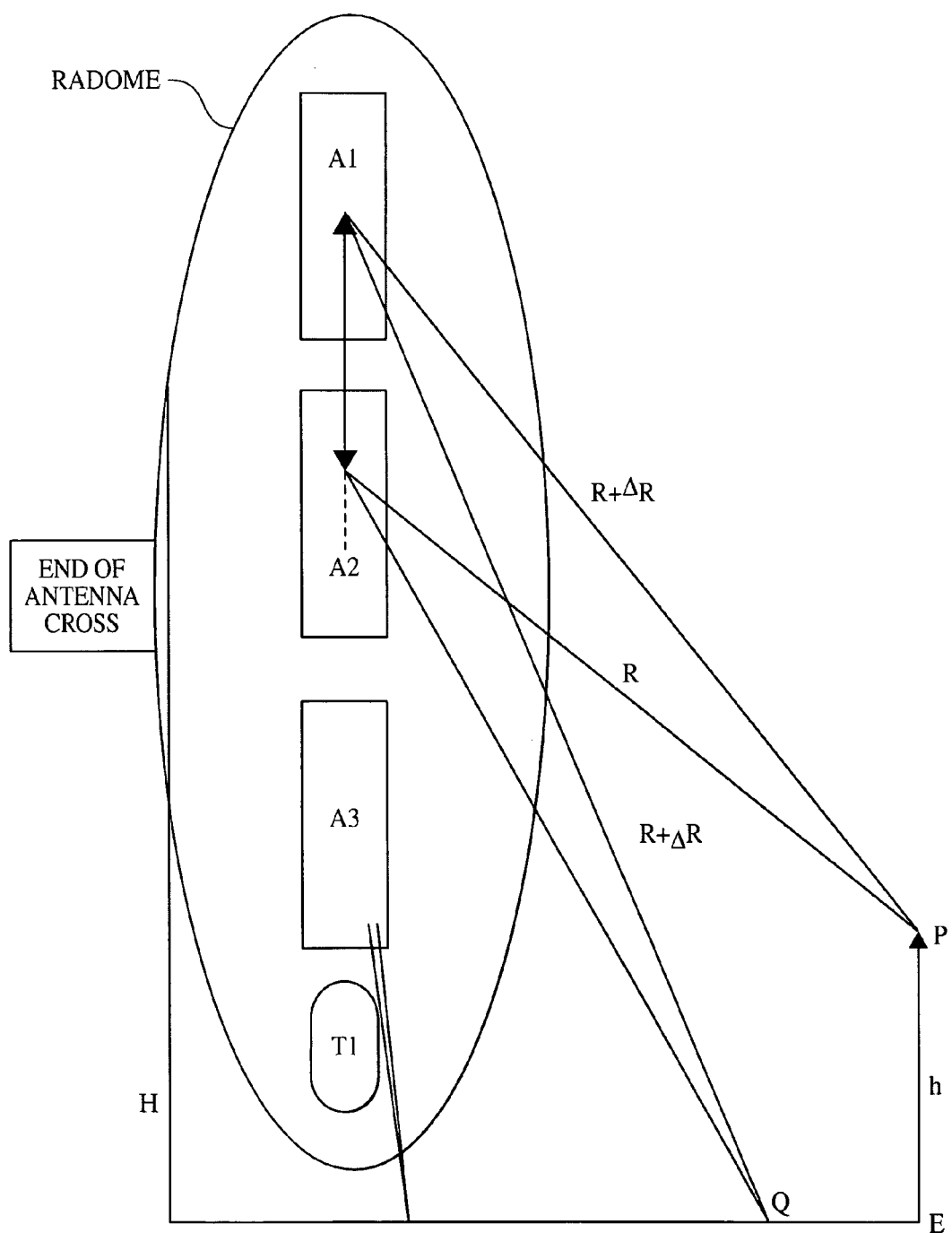
FIG. 4 is a second embodiment of the invention which includes an additional antenna.

In conjunction with an exemplified embodiment according to FIG. 1, the helicopter flies in the normal position, which means that the antennas $A_1$ and $A_2$ are positioned vertically one on top of the other. ΔR is determined based on equation (1). The value of the measured phase difference Δφ of the echo from the antennas $A_1$, and $A_2$ is ambiguous and can be determined only down to a value ranging between 0 and 2π. This ambiguity of 2π has to be determined by means of additional measurements. Thus, as shown in FIG. 4 an extra transmitter/receiver $A_3$ complementing the INROSAR conception comprising a transmitting/receiving antenna that has a narrow beam in elevation and covers the lower range of the sight angle can be used. The distance to the impact point on the ground can be clearly determined by the receive echo of this additional transmitting/receiving antenna. The INROSAR-system accepts the distance as a basic value and calculates the further ambiguities based on the rising distance from the continuous phase transitions. The following calculation example supplies the detailed explanations.

The calculation is based on the situation that the helicopter flies in its normal position. This means that the antennas $A_1$ and $A_2$ are vertically arranged one on top of the other.

The following parameters apply:

| Parameter | Meaning | Value 1/Value 2 |
|---|---|---|
| H | flight altitude of INROSAR | 100 m |
| R + ΔR | Distance between impact point P and antenna A1 | Example 1: 500.009 m<br>Example 2: 500.09 m |
| R | Distance between impact point P and antenna A2 | 500.00 m |
| B | Base line between the phase centers of the antennas | 0.15 m |
| δB | Error of length of base line B | 0.001 m |
| δφ | Phase noise of the INROSAR system | 5° |
| α | Angle in inclination of antennas A1 and A2 | 90° (vertically) |
| λ | Radar wavelength | 0.0090909 |

From equation (2) follows:

$$\theta = \arccos\left(\frac{(R+\Delta R)^2 - R^2 - B^2}{2 \cdot R \cdot B}\right) \quad (7)$$

EXAMPLE 1

$$\theta 1 = \arccos\left(\frac{(500.009^2 - 500.000^2 - 0.15^2)}{2 \cdot 500.000 \cdot 0.15}\right)$$
$$= \arccos(0.05985)$$
$$= 86.57°$$

$$h1 = 300 - 500.00 \cdot \cos(86.57°)$$
$$= 70.09 \text{ m}$$

EXAMPLE 2

$$\theta 1 = \arccos\left(\frac{(500.09^2 - 500.00^2 - 0.15^2)}{2 \cdot 500.000 \cdot 0.15}\right)$$
$$= \arccos(0.0599904)$$
$$= 53.14°$$

$$h1 = 300 - 500.00 \cdot \cos(53.14°)$$
$$= 0.048 \text{ m}$$

From the equations (4) and (5) follows for the scatter δh of the altitude h of the impact point P:

$$\delta h_{\delta\phi} = \frac{0.00909 \cdot 500.00}{4 \cdot \pi \cdot 0.15}(5°/57.3°)$$
$$= 0.21 \text{ m}$$

exactly: 0.210401168 m $$\delta h_{\delta B} = -500.00 \cdot \tan(53.14°) \cdot \frac{0.001}{0.15}$$
$$= 4.45 \text{ m}$$

– based on (2): $= 2.035 - 0.048$ m

This results in a scatter of the sight angle δθ as follows:

Due to phase noise, δφ=5°:

$$\delta\theta = \arcsin\left(\frac{0.21}{500.00}\right)$$
$$= 0.02°;$$

and because of errors in the length of base line B by δB=0.001 m:

$$\delta\Phi = \arcsin\frac{4.45}{500.00}$$
$$= 0.5°.$$

Figure 2:
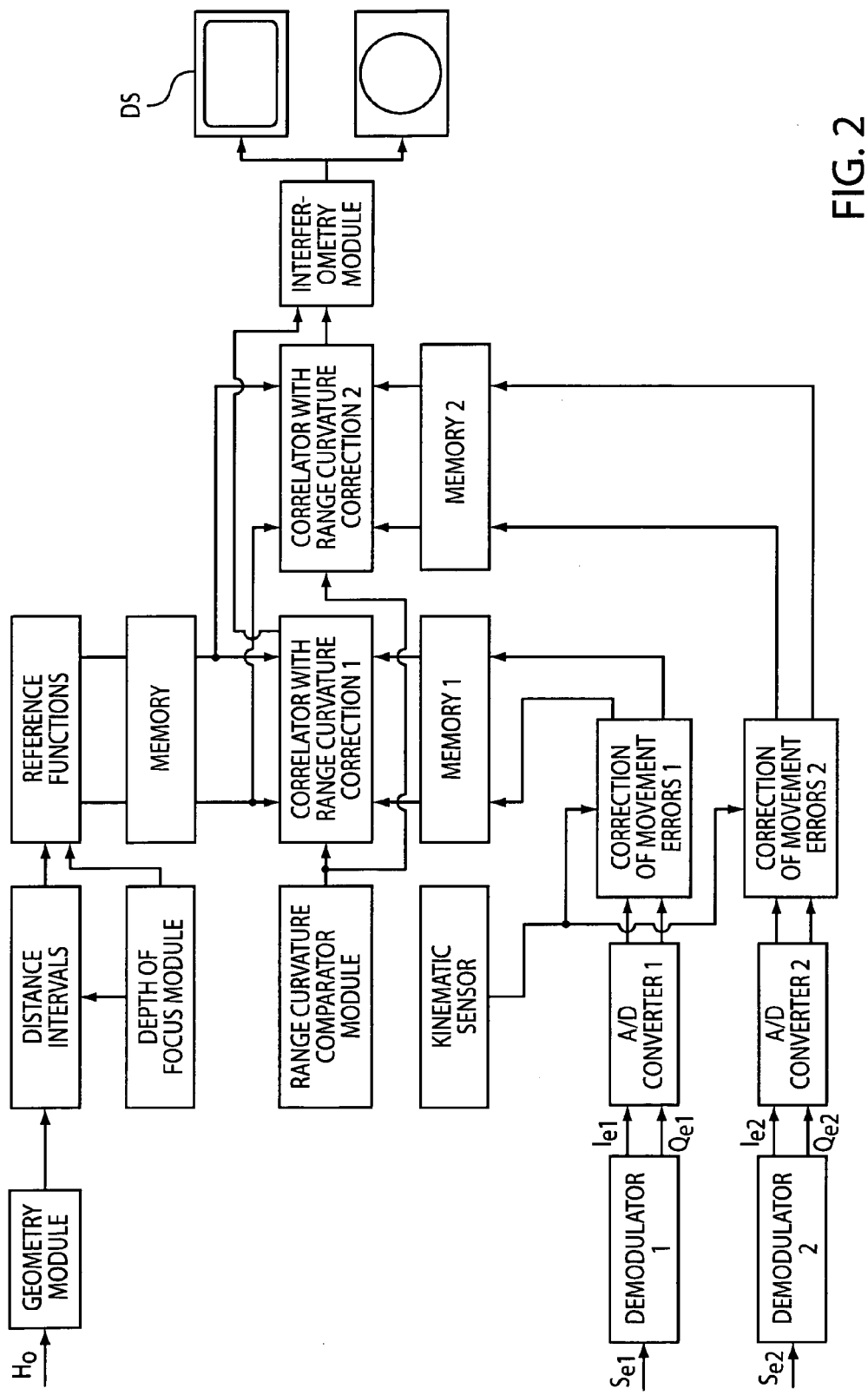
FIG. 2 shows a block diagram of the exemplified embodiment according to FIG. 1.

FIG. 2 shows a block diagram of the exemplified embodiment shown in FIG. 1. This block diagram is equipped with the components required for the proposed interferometric radar method and requires no further explanations for the expert in the field.

However, the process is as follows, transmitting antenna $T_1$ emits a signal that then reflects back as multiple signals including at least two received signals into Antennas $A_1$ and $A_2$ as signals Se1 and Se2 respectively. These signals are then fed into the electronic components as shown in FIG. 2. In addition, data of the height H0 is also fed into these electronic components.

These signals $S_{e1}$ and $S_{e2}$ are fed or decoupled into demodulator 1 and 2 respectively wherein they are then converted from analog signals into a digital signals in Analog Digital converters 1 and 2 respectively. Next, the signals undergo a correction of movement errors via input from a kinematic sensor wherein this information is then fed into the respective memories 1 and 2. This information is then processed in a correlator with range curvature correction wherein it is then processed in an interferometry module and then printed to an associated display screen.

Figure 3:
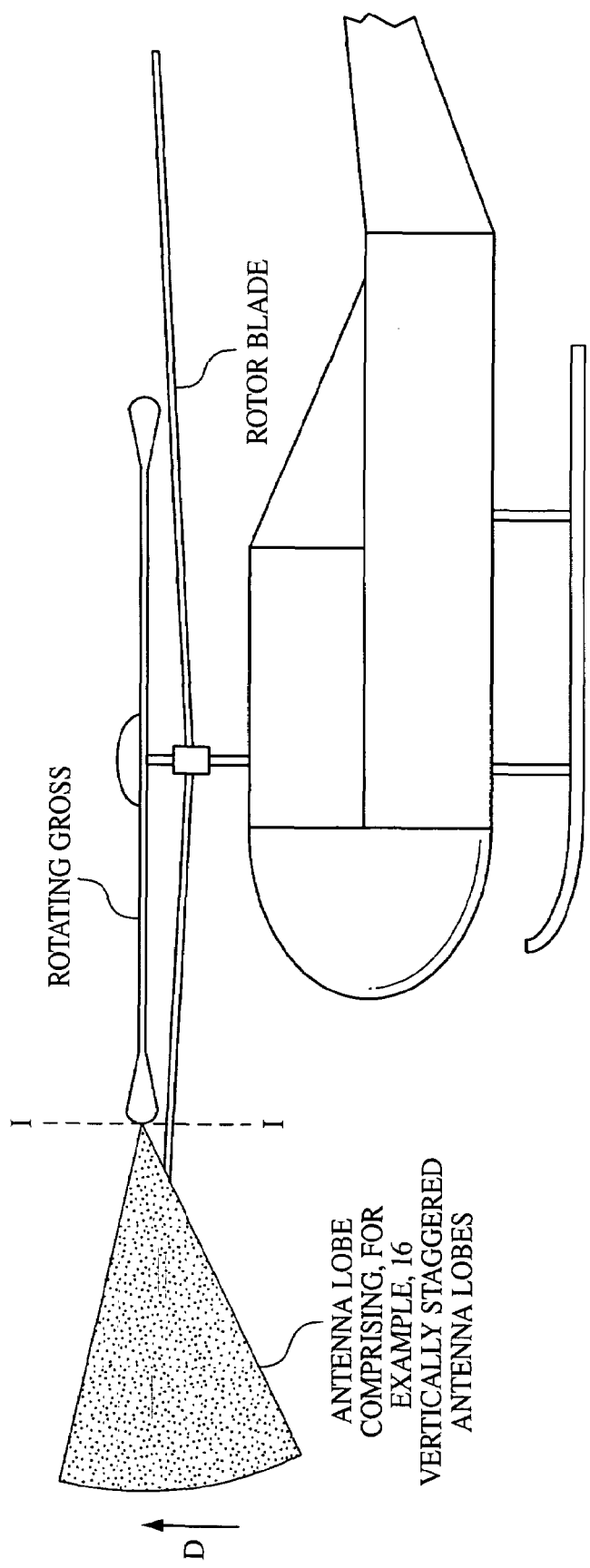
FIG. 3 is a perspective view of the state of the art with respect to the ROSAR principle.

FIG. 3 shows a display of a rotating cross having an antenna lobe which is used to emit and receive signals. The antenna lobe can contain the two antennas and one transmitter as shown in FIG. 1 or it can contain the two transmitters and one antenna in FIG. 4 which also includes the additional sharply focused antenna which includes an additional transmitter and receiver.

As shown in FIG. 4 this additional sharply focused signal covers a lower region of the associated sight angle wherein as described above, this additional antenna A3 including an additional transmitter and receiver is disposed adjacent to the other antennas $A_1$ and $A_2$ and the associated other transmitter $T_1$. This additional antenna is for correlating and calculating the different ambiguities of the received signals in antennas $A_1$ and $A_2$. The distance to the impact point on the ground can be clearly determined by the receive echo of this additional transmitting/receiving antenna. The INRO-SAR-system accepts the distance as a basic value and calculates the further ambiguities based on the rising distance from the continuous phase transitions.

Figure 5:
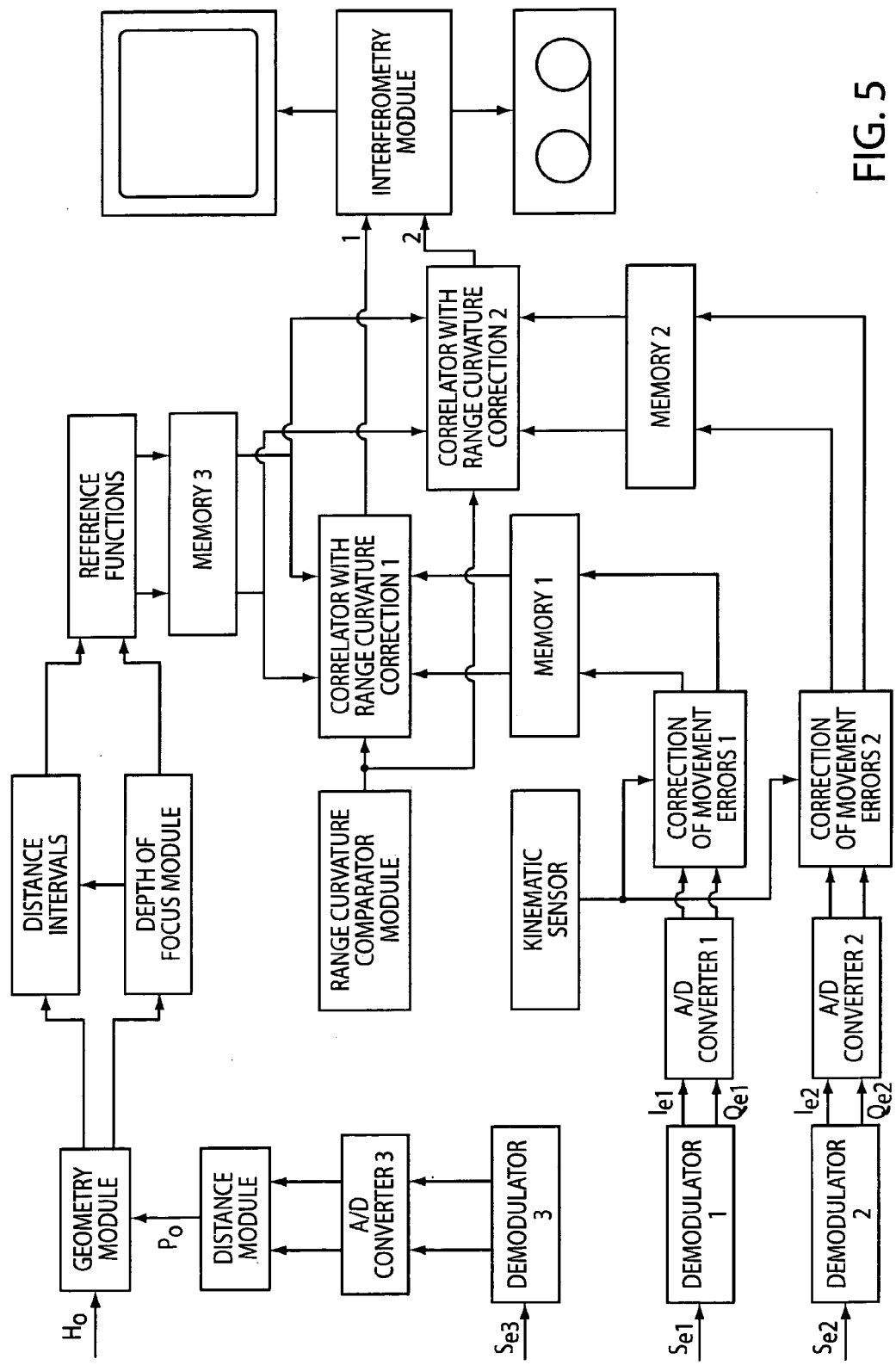
FIG. 5 is a block diagram of the electronic components associated with the design shown in FIG. 4.

Finally, FIG. 5 shows the electronics design similar to that shown in FIG. 2 wherein this design includes the input from the additional antenna and receiver A3 for additional processing.

For example, a coherent radar signal (See FIG. 4) is transmitted by one antenna $A_1$ and then received by two coherent receiving antennas $A_1$ and $A_2$. The two coherent signals $S_{e1}$ and $S_{e2}$ are coherently demodulated in Demodulator 1 and Demodulator 2 and then converted from an analog signal to a digital signal in Analog to Digital converter (A/D) converter 1 and A/D converter 2 respectively. This information is then respectively fed into a system for the correction of movement errors. In addition, a kinematic sensor determines the movement of the helicopter (altitude and velocity) and feeds this information in the modules "Correction of Movement Errors 1 and 2". These digital signals are then corrected and then written in Memory 1 and Memory 2.

A separate narrow beamed transmit/receive antenna supplies a signal $S_{e3}$ which is converted from analog to digital as well. In addition, in a distance module, an unambiguous distance $D_0$ to the nearest illuminated point on the ground is determined. The distance $D_0$ and the altitude $H_0$ are supplied to the Geometry Module. This information is forwarded to the Depth of Focus Module and Distance Intervals Module. Both modules in combination with the Reference Functions Module calculate current valid reference functions. These reference functions are written to Memory 3. The Range curvature comparator module determines the actual range curvature from the current helicopter movement and altitude. The reference functions from memory 3 and the current range curvature are fed in to the respective modules "Correlation with Range Curvature Correction 1 and 2" and corrected to reflect the current helicopter movement and altitude.

The radar signals from Memory 1 and Memory 2 are also fed into the respective modules "Correlation with Range Curvature Correction 1 and 2". Here they are correlated with the reference functions to give two 2 dimensional images 1 and 2. The two respective images 1 and 2 are forwarded to the Interferometry Module, where the 3-dimensional image is calculated. The 3-dimensional image is transformed to a quasi-3 dimensional image so that it can be shown on a 2 dimensional display.

Thus, with this additional signal $S_{e3}$ is used to clarify any ambiguities associated with the measurement of the other two signals $S_{e1}$ and $S_{e2}$ that are read by antennas $A_1$ and $A_2$.

Accordingly, while at least one embodiment of the present invention has been shown and described, it is to be understood that many changes and modifications may be made thereunto without departing from the spirit and scope of the invention as defined in the appended claims.

The invention claimed is:

1. An arrangement for interferometric radar measurement comprising:
   a transmitter disposed on a turnstile of a ROSAR system of a helicopter radar;
   at least two assigned coherent receiving antennas having receiving channels disposed on said turnstile of said ROSAR system of a helicopter radar; and
   an additional transmitting/receiving antenna disposed on said turnstile wherein said additional transmitting/receiving antenna has a narrow beam and is focused downward in elevation covering a lower range of a sight angle to determine a distance to an impact point on a surface and for further clarification of a received signal by said at least two assigned coherent receiving antennas.

2. The arrangement for interferometric radar measurement according to claim 1, wherein said transmitter and said at least two assigned coherent receiving antennas are arranged at an end of said turnstile.

3. The arrangement for interferometric radar measurement according to claim 1, wherein said receiving antennas are positioned vertically over each other in a normal position of a helicopter.

4. A process for interferometric radar measurement comprising the steps of:
   assigning two coherent receiving antennas having receiving channels to a transmitter;
   calculating a path length difference of two distances to a measured receiving point from a wave length of a transmitted radar signal and of a measured phase difference of a reception echo of both coherent receiving channels;
   assigning said two coherent receiving antennas to a transmitter of a ROSAR system; arranging said two coherent receiving antennas and said transmitter on a rotating turnstile of a radar; and
   evaluating signals of an additional transmitting/receiving antenna that has a narrow beam and is for determination of said phase difference of said reception echo of both coherent receiving channels;
   wherein a helicopter operating according to the ROSAR principle is used for the interferometric radar measurement.

5. The method according to claim 4, further comprising a step of calculating coordinates of a respective receiving point using a sight angle for representing image points on an integrated graphic display screen in the ROSAR system.

6. The method according to claim 5, wherein said antenna and a center of an image on said graphic display screen are in a fixed relationship.

* * * * *